Nov. 14, 1961     C. L. HAMBLIN ET AL     3,008,640
ELECTRIC COMPUTING APPARATUS
Filed Oct. 11, 1954
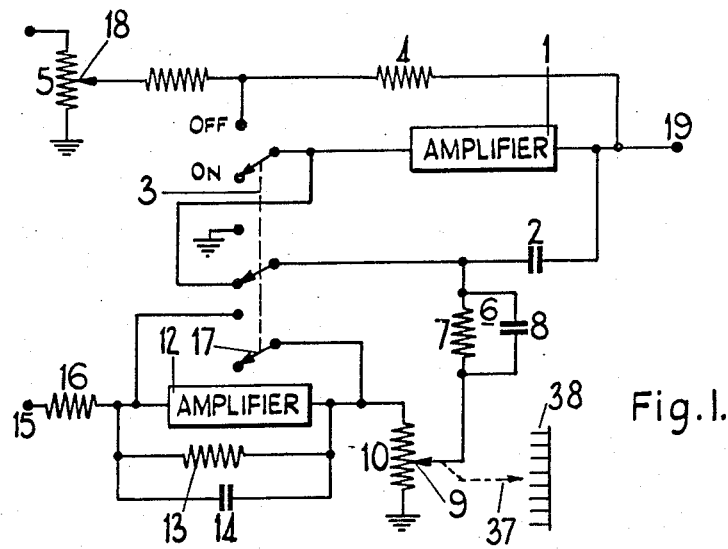
Fig.1.
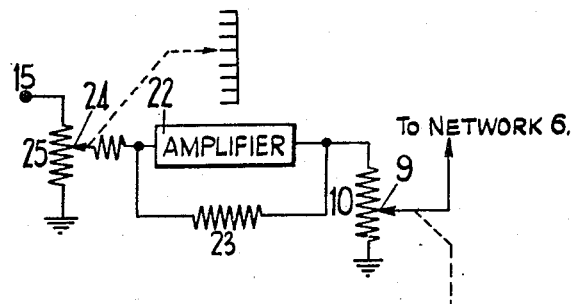
Fig.2.
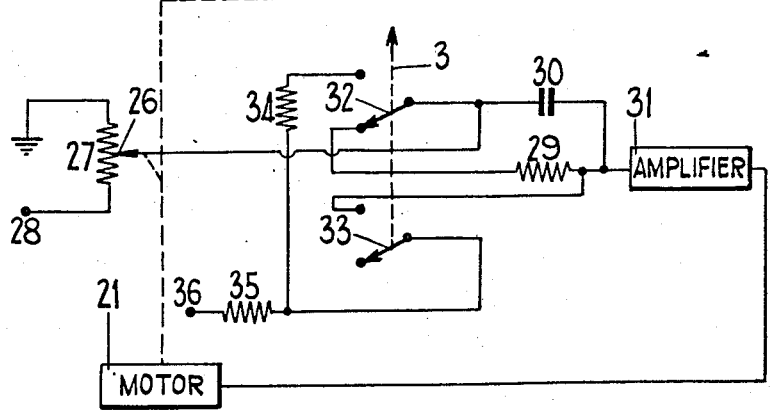
INVENTORS
CHARLES LEONARD HAMBLIN
CECIL JOHN WAYMAN
ATTORNEY United States Patent Office 3,008,640
Patented Nov. 14, 1961

3,008,640
ELECTRIC COMPUTING APPARATUS
Charles Leonard Hamblin, London, and Cecil John Wayman, Stanmore, England, assignors to The General Electric Company Limited, London, England
Filed Oct. 11, 1954, Ser. No. 461,612
Claims priority, application Great Britain Oct. 13, 1953
8 Claims. (Cl. 235—183)

This invention relates to electric apparatus, and is particularly concerned with electric apparatus for use in determining the rate of change in time of a voltage varying linearly in time.

It is known to determine the rate of change in time of a linearly varying voltage, by comparing it with the output of an integrating amplifier, the voltage input to which is adjusted until the output is varying at the same rate as the unknown voltage. The magnitude of the voltage input to the integrating amplifier may be set for example by means of a potentiometer, the position of the control shaft or the voltage at the tapping point of which may, for example, be taken as a measure of the rate of change of the unknown voltage.

If, for example, the output voltage is used to control the position of a marker on a radar display which may be the screen of a cathode ray tube, the unknown voltage being that representing and controlling the position of a target echo, facilities would be provided for initially aligning the marker and the target on the display before starting the computing apparatus into operation. A short time after so doing, when the target will have moved out of alignment with the marker, the potentiometer control would be adjusted, having initially been set at zero, to realign the marker on the target and the aim being to set it so that the marker follows the target without further adjustment (assuming the target to maintain a constant velocity). Initially the potentiometer control would have to be set too high to enable the marker to catch up and a number of subsequent adjustments would usually be needed before the correct setting is obtained with the marker aligned on the target.

To simplify the adjustments, it is known in what is called "rate plus position" tracking, to connect a capacitance across the resistance through which input voltage is applied to the integrating amplifier. If this is done, the variations of the potentiometer in the above example necessary to track the target are smoothed, and, if perfect tracking is carried out, the potentiometer control is adjusted by a smooth exponential rise up to the setting representing the target's velocity, the marker remaining aligned on the target throughout. The time constant of the rise is that of the capacitance-resistance circuit in the amplifier input, and may in a typical case be as much as 20 seconds to provide efficient smoothing of the velocity control. However this leads to a time lag of approximately the same duration, before it is possible to obtain even an approximate value for the rate of change of the unknown voltage from the computing apparatus. In some cases however, for example where the apparatus is used for tracking in an aircraft interception radar system, a more rapid assessment of the rate of change of the unknown voltage is required, and it is an object of the present invention to provide electric apparatus with which this is possible.

According to the present invention, electric apparatus comprises an integrating amplifier, a network comprising resistance and capacitance in parallel, said network being connected in series with the input to the amplifier and having a time constant $t'$, means for applying a voltage $V=bV_0(1-e^{-t/t'})$ to the amplifier through the network, where $V_0$ is a constant, $t$ is the time measured from the moment of starting the apparatus in operation, $e$ is the base of Naperian logarithms and $b$ is an adjustable parameter, and means for indicating the instantaneous value of $b$ or a quantity proportional thereto.

The said means for applying the voltage $$V=bV_0(1-e^{-t/t'})$$

to the amplifier through the network may comprise a linear adjustable resistance potentiometer, the slider of which is electrically coupled to the ends of the network remote from the amplifier to apply to the network a voltage equal or proportional to that at the slider, and means for applying a voltage $V'=V_0(1-e^{-t/t'})$ across the potentiometer, the position of the slider thus being a measure of the parameter $b$. In another arrangement, said means may comprise a linear adjustable resistance potentiometer, the slider of which is electrically coupled to the end of the network remote from the amplifier to apply to the network a voltage proportional to that at the slider, and is driven by a motor from the start of a computation to vary from a datum position by amounts proportional to $(1-e^{-t/t'})$, and means for applying a voltage $bV_0$ across the potentiometer proportional in magnitude to the voltage at the slider of a further linear adjustable resistance potentiometer, the position of the slider of which is a measure of parameter $b$. In this second case, the motor may be a servo motor forming part of a closed loop comprising a third linear adjustable potentiometer, the slider of which is also driven by the motor, and means for applying the voltage, or a voltage proportional thereto, at the slider of this third potentiometer to a differentiating amplifier, having a differentiating time constant equal to $t'$, the output of which is applied to control the position of the motor.

Two examples of electric apparatus in accordance with the present invention will now be described with reference to the two figures of the accompanying drawings in which FIGURE 1 shows diagrammatically the first example of apparatus and FIGURE 2 shows diagrammatically part of the second example.

Each of the examples now to be considered is arranged to supply a variable voltage for the purpose of controlling in a known manner the position of a marker on a radar display and referring now to FIGURE 1, the first example of apparatus in accordance with the invention comprises a high gain D.C. amplifier 1 which has a feedback capacitor 2 of value $C_1$ connected between its output and its input when a switch 3 is in its "on" position as shown in the drawing. This switch 3 is in fact a three-pole double throw switch and constitutes the start switch of the apparatus, it being moved from its "off" position to its "on" position when the apparatus is to be brought into operation. In the "off" position of the start switch 3, a resistor 4 is connected between the output and the input of the amplifier 1 and the arrangement is such that a variable voltage which is derived from a potentiometer 5 is then applied to the input of the amplifier 1. In this position of the switch 3 the capacitor 2 is disconnected from the input of the amplifier 1 and then connected between the output of the amplifier and earth. The side of the capacitor 2 which may be switched in this manner is connected to a network 6 which is formed by a resistor 7 of value $R_1$ and a capacitor 8 of value $C_2$ in parallel, the other terminal of this network 6 being connected to the slider 9 of a linear variable resistance potentiometer 10.

One end of the potentiometer 10 is earthed and the other is connected to the output of a high gain D.C. amplifier 12, between the output and the input of which are connected in parallel a resistor 13 and a capacitor 14 of values $R_1$ and $C_2$ respectively. A stabilised D.C. potential $V_0$ is applied to a terminal 15 which is connected to the input of the amplifier 12 through a resistor 16. The contact 17 of the start switch 3 is arranged to short circuit the amplifier 12 when the switch is in its "off" position, this short circuit being removed when the switch is in its "on" position.

The voltage developed at the terminal 19 is utilized to control the position of the marker on the radar display. During operation the apparatus is controlled, as now to be described, so that the marker is aligned with a target on the display so that the output voltage developed at the terminal 19 is equal to or approaches the value of an unknown voltage controlling the position of the target echo. When the apparatus is to be brought into operation the variable potentiometer 10 is set with its slider 9 at earth potential and the start switch 3 is in its "off" position. The slider 18 of the potentiometer 5 is moved by hand so that the voltage applied to the input of the amplifier 1 is first varied to a value which is such that the voltage developed at the terminal 19 is equal to that of the unknown voltage as indicated by the marker and target being aligned on the display.

The start switch 3 is then switched to its "on" position with the result that the amplifier 1 becomes an integrating amplifier while the amplifier 12 also becomes an integrating amplifier and has its output applied across the potentiometer 10. The voltage $V'$ developed across the potentiometer 10 is then equal to $V_0(1-e^{-t/t'})$, where $t'$ is the time constant of the network formed by the resistor 13 and the capacitor 14 and is equal to the product $R_1C_2$ while $t$ is the time measured from the moment of operating the switch 3. After a slight pause the position of the slider 9 of the potentiometer 10 is then adjusted by hand to keep the output voltage developed at the terminal 19 as nearly as possible equal to the unknown voltage which of course may itself be varying. By this adjustment a voltage $$V = bV' = bV_0(1-e^{-t/t'})$$

is applied to the network 6 in the input circuit of the amplifier 1 while it will be realised that the time constant of the network 6 is itself $t'$.

If now it is assumed that he required rate of change of the voltage developed at the terminal 19 is constant and has a value $V_{out}$, it is necessary for the input voltage $V$ supplied to the network 6 in the input circuit of the amplifier 1 to have a value equal to $C_1R_1(1-e^{-t/t'})V_{out}$. This value of $V$ and the previously mentioned value $(bV_0(1-e^{-t/t'})$ are the same provided $b=C_1R_1\dot{V}/V$ and it will be noted that, under these conditions, $b$ is independent of time. The value of the parameter $b$ is given by the position of the slider 9 and this position, as soon as the slider has been adjusted as aforesaid, is therefore a measure of the rate of change of the output voltage developed at the terminal 19. In order that this value may be read off an index 37 may be coupled to the slider 9, this index 37 co-operating with an associated scale 38.

If the unknown voltage does not vary at a constant rate but follows some other law, it is of course necessary continuously to adjust the position of the slider 9 of the potentiometer 10 so that the voltage developed at the terminal 19 is as nearly as possible equal to the unknown voltage. The output voltage at the terminal 19 may, however, be considered as being made up of a plurality of linear portions having different slopes and it follows that, by adjusting the position of the slider 9 in this manner, the output voltage may follow the unknown voltage within the limits of accuracy of making the adjustment, the value of $b$ representing the rate of change of the output voltage at all times. Initially it will probably be found necessary to vary the setting of the potentiometer 10, that is to say the value of $b$, slightly above the correct value, but the value given will gradually settle down to remain steady at the correct value, the time taken to obtain the correct value dependent upon the skill with which the potentiometer adjustments are made. However, as soon as the adjustment is started the value of $b$ approximates to the correct one, whereas in the prior arrangements described above there may be a delay of as much as 20 seconds before even an approximate value of the rate of change can be obtained.

The second example of apparatus in accordance with the present invention is identical with that described above with reference to FIGURE 1 except that there is a different method of deriving the voltage $V$ that is applied to the network 6. Referring now to FIGURE 2 which only shows that part of the apparatus for deriving the voltage $V$, this voltage is again supplied from the slider 9 of a potentiometer 10 but in this case the slider 9 is arranged to be driven by an electric motor 21. The voltage applied across the potentiometer 10 is supplied by a high gain D.C. amplifier 22 which has a resistor 23 connected between its output and its input. The input of this amplifier 22 is fed with the voltage derived from the slider 24 of a potentiometer 25, this potentiometer 25 being connected between the terminal 15 which is maintained at the stabilised voltage $V_0$ and earth. The slider 24 may be adjusted manually so that the voltage applied across the potentiometer 10 may be represented by $bV_0$, where $b$ is determined by the setting of the potentiometer 25.

In this example, the start switch 3 has two additional contacts 32 and 33 and when the switch 3 is in its "on" position, the motor 21 which drives the slider 9 of the potentiometer 10 forms part of a closed loop servo system. In fact the motor 21 also drives the slider 26 of a potentiometer 27 which is connected between earth and a terminal 28 that is maintained at a constant positive voltage with respect to earth. The voltage developed at the slider 26 is fed through a network comprising a resistor 29 and a capacitor 30 in parallel to the input of a high gain D.C. amplifier 31. The network formed by the resistor 29 and the capacitor 30 is arranged to have a time constant $t'$ and the output of the amplifier 31 is fed to the motor 21 for the purpose of controlling its position.

When the start switch 3 is in its "off" position, two resistors 34 and 35 are connected in series between the slider 26 and a terminal 36 that is maintained at a constant negative voltage with respect to earth, the input of the amplifier 31 being connected to the junction of the resistors 34 and 35. These resistors 34 and 35 may have the same resistance which is considerably less than, say one tenth, that of the resistor 29. When the switch 3 is in the "off" position, the motor 21 drives the slider 26 to a position such that the voltage fed to the amplifier 31 is small and since this voltage is the difference between the voltage at the slider 26 and the voltage across the resistor 34, it follows that the final position of the slider 26 is close to the high voltage end of the potentiometer 27. In this position of the switch 3, the capacitor 30 is connected directly across the resistor 34 and since the input voltage to the amplifier 31 is very small, the voltage across the capacitor 30 is approximately equal to that at the slider 26.

On subsequently moving the start switch 3 to its "on" position, the voltage supplied to the amplifier 31 is the difference between the voltage at the slider 26 and the voltage across the capacitor 30. Initially these two voltages are approximately equal but the voltage across the capacitor 30 decreases exponentially due to the effect of the resistor 29 which is connected across the capacitor. At an instant $t$ after the switch 3 is moved to the "on" position, the voltage across the capacitor 30 has its initial value multiplied by the factor $e^{-t/t'}$. Any change in the input voltage to the amplifier 31 is however automatically compensated by the servo system, the motor 21 driving the slider 26 so that at all times the voltage at the slider 26 is approximately equal to that across the capacitor 30. It follows, therefore, that the motor 21 drives the sliders 9 and 26 from their datum positions by amounts proportional to the quantity $$(1-e^{-t/t'})$$

This being so the voltage V developed at the slider 9 varies in time when the start switch 3 is moved to its "on" position and this voltage is equal to $bV_0(1-e^{-t/t'})$. Prior to the switch 3 being moved to its "on" position $b$ is set to zero or some other convenient datum by movement of the slider 24 and at a given time after operating the switch 3 the slider 24 is adjusted to keep the output voltage of the apparatus equal to the unknown voltage. As before $b$ will oscillate slightly initially about the correct value but an approximate computed value at the rate of change of the unknown voltage will be available at once.

One important application of apparatus in accordance with the present invention, is in association with radar systems. For example in an airborne search radar system, it may be required to determine rapidly and accurately the course and speed of a target echo seen on a display, in order to supply such information to an interception computer. In this case there would be two or more unknown voltages representing the co-ordinates of the target's position, with reference to orthogonal axes, for example the north and east axes through a datum origin. The output voltages from the computing apparatus may be compared with the unknown voltages by moving them to control the position of a target marker, the apparatus being correctly set when the target marker tracks the target exactly, assuming the target to maintain a constant course and speed.

In this application the apparatus, which may for example be either of the forms described above with reference to the FIGURES 1 and 2, is duplicated in part. Thus using apparatus of the form described with reference to FIGURE 1 as amended by FIGURE 2 the amplifier 1 and its associated circuitry including the potentiometer 10 is duplicated. The sliders 9 of the two potentiometers 10 are however driven by a common motor 21. Moreover only one potentiometer 25 is employed, an additional amplifier network being utilised to apply equal and opposite voltages proportional to the voltage at its slider 24 to opposite ends of a sine-cosine potentiometer, the setting of which is controlled by a target course setting control. The two outputs from the sine-cosine potentiometer, representing in effect north and east components of the target's velocity are applied through further amplifiers across the two potentiometers 10 respectively. The outputs from the two amplifiers 1 are, therefore, then representative of the north and east co-ordinates respectively of the target's position.

In operation the target marker would first be aligned on the target by adjusting the voltages applicable to the inputs of the amplifiers 1 when the start switch 3 is in its "off" position. After alignment the start switch is put "on" and after a pause the target course control of the sine-cosine potentiometer and the slider 24 of the potentiometer 25 are adjusted to bring the target marker back on the target. Subsequent adjustments may be made, as previously described, but the initial value of target speed represented by the quantity $b$ is approximately correct. In addition by taking the voltages applied to the potentiometers 10, the north and east components of the target's speed are obtained.

It will be appreciated that many other forms of apparatus in accordance with the present invention may be provided, the basic requirement being the multiplication of an adjustable voltage, invariant in time, with one varying in time according to the function $(1-e^{-t/t'})$, to give the correct voltage for application to the network and amplifier.

Further where more complex amplifiers are employed, having transfer functions of different types, it is theoretically always possible (a) to determine the network necessary to give the initial voltage matching and (b) to determine the corresponding form of time variation required in the input voltage, to make instant appreciation of the rate of change of the unknown voltage possible.

We claim:

1. Electric apparatus to supply a variable voltage for controlling a marker on a radar display comprising an integrating amplifier having an input and an output, voltage generating means for generating a voltage $$V=bV_0(1-e^{-t/t'})$$

where $V_0$ is a constant, $t$ is the time measured from the moment of starting the apparatus in operation, $t'$ is a constant, $e$ is the base of Naperian logarithms and $b$ is a parameter, a resistance-capacity network which has a time constant $t'$, means to connect the said network between the voltage generating means and the amplifier input, means for varying the parameter $b$, and means for indicating a measure of the instantaneous value of $b$.

2. Electric apparatus according to claim 1 wherein the said voltage generating means comprises a resistance potentiometer having an adjustable slider, a path connected between the said slider and the end of the said network remote from the amplifier, and means for applying a voltage $V'=V_0(1-e^{-t/t'})$ across the potentiometer.

3. Electric apparatus according to claim 2 wherein the said potentiometer is a linear potentiometer.

4. Electric apparatus to supply a variable voltage for controlling a marker on a radar display comprising an amplifier having an input and an output, a capacitance, means to connect one side of the said capacitance to the amplifier output, means to connect the other side of the said capacitance to the amplifier input, voltage generating means for generating a voltage $$V=bV_0(1-e^{-t/t'})$$

where $V_0$ is a constant, $t$ is the time measured from the moment of starting the apparatus in operation, $t'$ is a constant, $e$ is the base of Naperian logarithms and $b$ is a parameter, resistance and capacity connected in parallel to form a two-terminal network which has a time constant $t'$, a path connected between the voltage generating means and one terminal of the said network to apply the voltage V to the network, a path connected between the other terminal of the said network and the amplifier input, means for varying the parameter $b$ and means for indicating a measure of the instantaneous value of $b$.

5. Electric apparatus to supply a variable voltage for controlling a marker on a radar display comprising an integrating amplifier having an input and an output, a resistance potentiometer having an adjustable slider, a resistance-capacity network which has a time constant $t'$, a path connected between the said potentiometer slider and one end of the said network, a path connected between the other end of the said network and the amplifier input, and means for applying a voltage $$V'=V_0(1-e^{-t/t'})$$

across the potentiometer where $V_0$ is a constant, $t$ is the time measure from the moment of starting the apparatus in operation and $e$ is the base of the Naperian logarithms, the position of the said potentiometer slider being a measure of the rate of change in time of the voltage at the amplifier output.

6. Electric apparatus to supply a variable voltage for controlling a marker on a radar display comprising an integrating amplifier having an input and an output, a first linear resistance potentiometer having an adjustable slider, a resistance-capacity network which has a time constant $t'$, a path which is connected between the said slider of the first potentiometer and one end of the said network, a path which is connected between the other end of the said network and the amplifier input, means to move the slider of the first potentiometer from a datum position at time $t=0$ by amounts proportional to $(1-e^{-t/t'})$ where $t$ is the time measured from the moment of starting the apparatus in operation and $e$ is the base of Naperian logarithms, a second resistance potentiometer having an adjustable slider, means for supplying a voltage $V_0$ across the second potentiometer, means for applying across the first potentiometer a voltage proportional in magnitude to the voltage of the slider of the second potentiometer, and means for varying the position of the slider of the second potentiometer, the position of the slider of the second potentiometer being a measure of the rate of change in time of the voltage at the amplifier output.

7. Electric apparatus according to claim 6 wherein the second potentiometer is a linear potentiometer.

8. Electric apparatus according to claim 6 wherein the said means to move the said slider of the first potentiometer comprises an electric motor, a third linear potentiometer having an adjustable slider, a coupling between the said electric motor and the sliders of both the first and third potentiometers, a differentiating amplifier having an input and an output and which has a differentiating time constant equal to $t'$, a path connected between the slider of the third potentiometer and the input of the differentiating amplifier, a path connected between the output of the differentiating amplifier and the said motor for the purpose of providing an electric supply to the motor, and means to supply a steady voltage across the third potentiometer.

References Cited in the file of this patent

UNITED STATES PATENTS 2,617,842    Fink _____ Nov. 11, 1952

OTHER REFERENCES

"A Simplified Solution and New Application of an Analyzer of Algebraic Polynomials" (Lukaszervicz) Bulletin De L'Academie Polonaise Des Sciences Cl. IV– vol. I, No. 3, 1953 (pg. 105 relied on).